United States Patent
Joo

(10) Patent No.: US 9,568,303 B2
(45) Date of Patent: Feb. 14, 2017

(54) DEVICE AND METHOD FOR INSPECTING A SEALING MEMBER

(71) Applicant: Samsung Display Co., Ltd., Yongin, Gyeonggi-Do (KR)

(72) Inventor: Wan-Jae Joo, Yongin (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 552 days.

(21) Appl. No.: 14/133,940

(22) Filed: Dec. 19, 2013

(65) Prior Publication Data
US 2015/0022652 A1 Jan. 22, 2015

(30) Foreign Application Priority Data

Jul. 19, 2013 (KR) .................. 10-2013-0085618

(51) Int. Cl.
| | | |
|---|---|---|
| *H04N 7/18* | (2006.01) | |
| *G01B 11/02* | (2006.01) | |
| *G02B 21/36* | (2006.01) | |
| *G02B 21/08* | (2006.01) | |
| *G02B 21/10* | (2006.01) | |

(52) U.S. Cl.
CPC ............ *G01B 11/022* (2013.01); *G02B 21/084* (2013.01); *G02B 21/10* (2013.01); *G02B 21/361* (2013.01); *H04N 7/18* (2013.01)

(58) Field of Classification Search
CPC ........ H04N 7/18; G01N 21/88; G01N 21/956; G01N 21/95684
USPC .......................................................... 348/125
See application file for complete search history.

(56) References Cited

U.S. PATENT DOCUMENTS

| 6,061,086 A * | 5/2000 | Reimer .............. G01N 21/8851 |
| | | 348/125 |
| 2012/0069584 A1* | 3/2012 | Kawabe ................. H05K 1/189 |
| | | 362/382 |

FOREIGN PATENT DOCUMENTS

| JP | 2000-039599 A | 2/2000 |
| JP | 2005-181631 A | 7/2005 |
| KR | 1020120043435 A | 5/2012 |

* cited by examiner

Primary Examiner — Michael Lee
(74) Attorney, Agent, or Firm — Cantor Colburn LLP

(57) ABSTRACT

A sealing inspection device includes a scan unit through which a display device substrate including a top plate coupled to a bottom plate by a sealing member in the sealed area passes; and a photographing unit through which the display device substrate which has passed through the scan unit, further passes. The scan unit generates coordinate values of the sealed area of the display device substrate, detects a defective region in the sealed area of the display device substrate, and includes a plurality of scan cameras. The photographing unit generates an image of the sealed area of the display device substrate using the generated coordinate values, measures an effective sealing width of the sealed area using the generated image, and comprises a measuring camera.

16 Claims, 8 Drawing Sheets

DEVICE AND METHOD FOR INSPECTING A SEALING MEMBER

This application claims priority to Korean Patent Application No. 10-2013-0085618 filed on Jul. 19, 2013, and all the benefits accruing therefrom under 35 U.S.C. §119, the entire contents of which are incorporated herein by reference.

BACKGROUND (a) Field

The invention relates a sealing inspection device and a sealing inspection method. More particularly, the invention relates to a sealing inspection device and a sealing inspection method for inspecting a sealed state of a sealed area of a substrate formed by coupling a top plate and a bottom plate to each other by a sealing member.

(b) Description of the Related Art

As an information-oriented society has developed, the demand for various types of display devices has also increased. Accordingly, various kinds of display devices such as a liquid crystal display ("LCD", a plasma display panel ("PDP") and an organic light emitting diode ("OLED") display have been researched and actively employed as display devices for a variety of equipment.

The OLED display among these kinds of display devices has a structure in which elements such as an organic layer including an emission layer is interposed between a pair of electrodes, e.g., first and second electrodes.

When moisture and/or oxygen are introduced into elements of the OLED display, the elements have various problems in that life span of the elements is reduced due to oxidation or exfoliation of an electrode material therein, light efficiency is deteriorated, and a light emitted color is deteriorated.

Therefore, encapsulation is typically performed to isolate the elements of the OLED display from the outside and prevent moisture from permeating thereto, in a manufacturing process of the OLED display.

To that end, the general OLED display generally includes a display substrate including an organic layer, and an encapsulation substrate disposed opposite to the display substrate and coupled to a sealing member (e.g., a sealant) to perform encapsulation of elements of the OLED display.

In a manufacturing process of the OLED display, the sealing member is coated on a sealed area of the OLED display and then cured such as by laser irradiation. In a curing operation or while a sealed state OLED display is transported, errors or defects are generated in the sealed state OLED display. Therefore, there remains a need for an improved manufacturing or inspection process for an OLED display which evaluates sealing effectiveness in a sealed state of the OLED display.

SUMMARY

One or more exemplary embodiment of the invention provides a sealing inspection device capable of measuring an effective sealing width of a sealed area.

One or more exemplary embodiment of the invention also provides a sealing inspection method capable of measuring an effective sealing width of a sealed area.

An exemplary embodiment of the invention provides a sealing inspection device for inspecting a state of a sealed area. The device includes: a scan unit through which a display device substrate including a top plate coupled to a bottom plate by a sealing member in the sealed area passes; and a photographing unit through which the display device substrate which has passed through the scan unit, further passes. The scan unit generates coordinate values of the sealed area of the display device substrate, detects a defective region in the sealed area of the display device substrate, and includes a plurality of scan cameras. The photographing unit generates an image of the sealed area of the display device substrate using the generated coordinate values, measures an effective sealing width of the sealed area using the generated image, and includes a measuring camera.

The measuring camera may include a dark-field illumination member.

The dark-field illumination member may be attachable to and detachable from the measuring camera.

The measuring camera may include an attachable microscope lens which is attachable to and detachable therefrom, and the dark-field illumination member may be in the microscope lens.

The dark-field illumination member may include a plurality of point light sources arranged annularly at an edge portion of the microscope lens.

The plurality of point light sources may respectively emit light obliquely with reference to a facing direction of the microscope lens.

The device may further include a stage upon which the display device substrate is mounted, and the stage may be configured to move the display device substrate from the scan unit toward the photographing unit.

The photographing unit, using the measuring camera, may generate an image of the defective region detected by the scan unit.

The measuring camera may be movable in at least one axis direction.

The display device substrate may an organic light emitting element.

Another exemplary embodiment of the invention provides a sealing inspection method for inspecting a state of a sealed area. The method includes: detecting a defective region of the sealed area of a display device substrate including a top plate coupled to a bottom plate by a sealing member in the sealed area, in a scanning unit of a sealing inspection device; photographing the detected defective region to generate an image of the defective region, in a photographing unit of the sealing inspection device; and measuring an effective sealing width of the sealed area.

The detecting may include: generating coordinate values of the sealed area; and detecting the coordinate values of the defective region of the sealed area by using a plurality of scan cameras of the scanning unit.

The photographing may include: positioning a measuring camera of the photographing unit at the defective region of the sealed area by using the detected coordinate values of the defective region; and generating the image of the defective region by using the measuring camera positioned at the defective region.

The measuring may include measuring the effective sealing width of the sealed area may include using a measuring camera of the photographing unit, the measuring camera including a dark-field illumination member.

The measuring camera may include a microscope lens which is attachable thereto and detachable therefrom, and the dark-field illumination member is in the microscope lens.

The dark-field illumination member may include a plurality of point light sources arranged annularly at an edge portion of the microscope lens.

The plurality of point light sources may respectively emit light obliquely with reference to a facing direction of the microscope lens.

In accordance with one or more exemplary embodiment of the invention, a sealed area may be efficiently inspected by photographing the sealed area and generating an image thereof.

In accordance with one or more exemplary embodiment of the invention, an effective sealing width of the sealed area may be measured by using a camera equipped with a dark-field illumination member.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
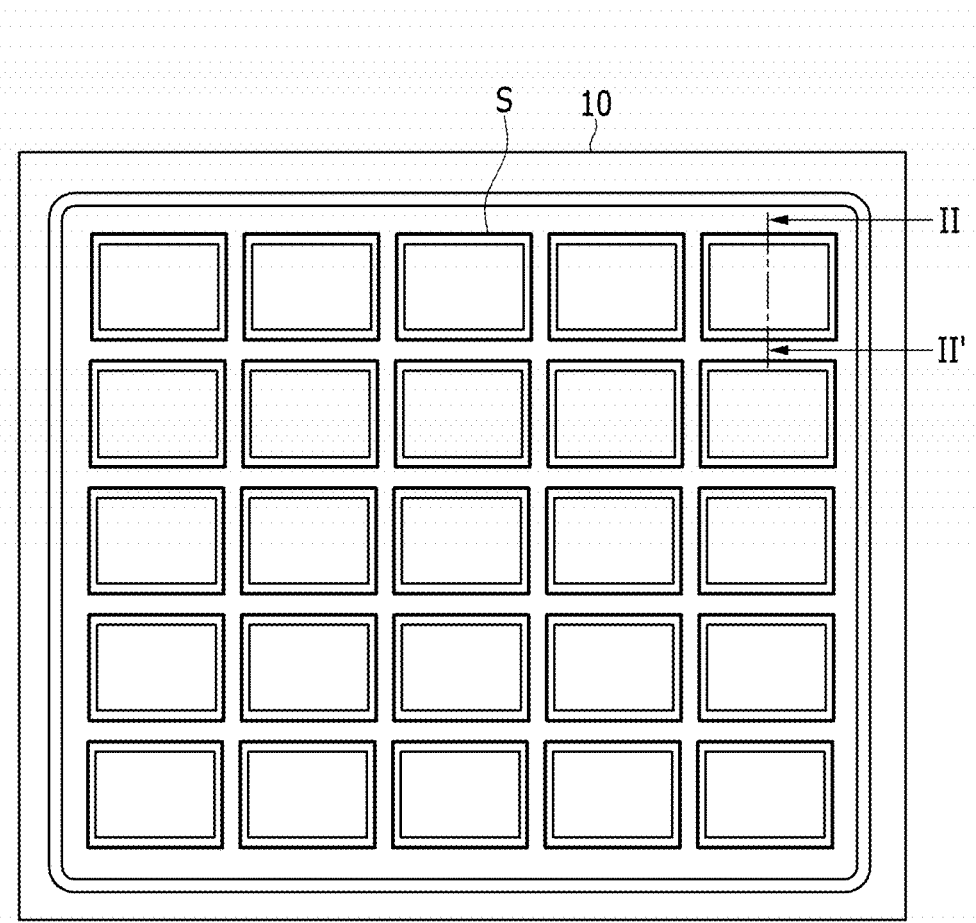
FIG. 1 is a plan view of an exemplary embodiment of a substrate.

Hereinafter, exemplary embodiments of the invention will be described in detail with reference to the attached drawings such that the invention can be easily put into practice by those skilled in the art. As those skilled in the art would realize, the described exemplary embodiments may be modified in various different ways, all without departing from the spirit or scope of the invention.

In the drawings and this specification, parts or elements that are not related to the description hereof are omitted in order to clearly describe the invention, and the same or like constituent elements are designated by the same reference numerals throughout the specification. As used herein, the term "and/or" includes any and all combinations of one or more of the associated listed items. In addition, the size and thickness of each component shown in the drawings are arbitrarily shown for better understanding and ease of description, but the invention is not limited thereto.

Further, throughout this specification, when a first part of a layer, a film, a plate, or the like is described as being arranged "on" or "over" a second part, this indicates that the first part is arranged on or over the second part directly or with a third part therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "above" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2:
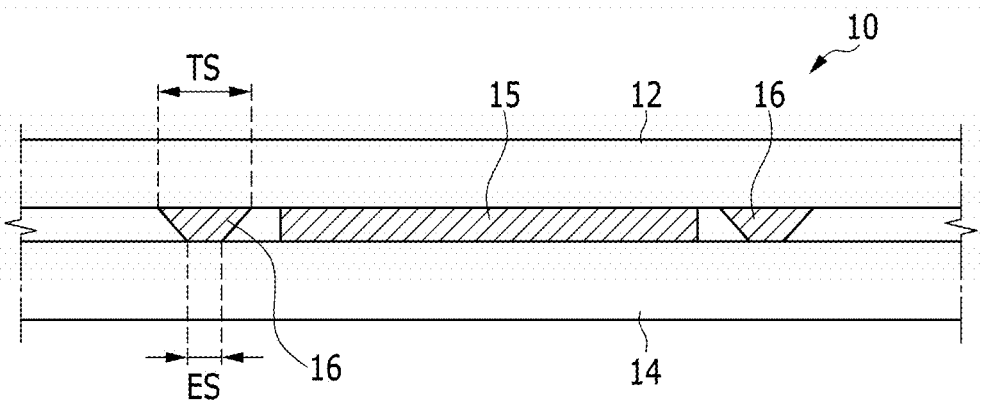
FIG. 2 is a cross-sectional view taken along line II-II' of FIG. 1.

FIG. 1 is a plan view of an exemplary embodiment of a substrate, and FIG. 2 is a cross-sectional view taken along line II-II' of FIG. 1.

First, an exemplary embodiment of a substrate 10 serving as a target object to be inspected will be described before describing a sealing inspection device, in accordance with the invention.

One or more exemplary embodiment of a sealing inspection device in accordance with the invention serves as a device for inspecting a sealed area S of the substrate 10 to determine whether or not the substrate 10 is defective by detecting whether or not the sealed area S of the substrate 10 is defective.

Referring to FIG. 1 and FIG. 2, the substrate 10 has a structure in which a top plate 12 and a bottom plate 14 are coupled or adhered to each other by a sealing member 16. In the illustrated exemplary embodiment, the substrate 10 may be a substrate for a display device, but the invention is not limited thereto.

In one exemplary embodiment, for example, the substrate 10 may be a substrate for an organic light emitting diode ("OLED") display including an organic light emitting element.

Where the substrate 10 is a substrate for an OLED display, the bottom plate 14 may be a display substrate on which an emission layer 15 including an organic light emitting element is disposed, and the top plate 12 may be an encapsulation substrate which encapsulates the display substrate and the elements thereon.

Accordingly, the exemplary embodiment of the substrate 10 serving as a target object to be inspected by one or more exemplary embodiment of a sealing inspection device may be an adhering substrate having a structure encapsulated by the encapsulation structure.

In accordance with the illustrated exemplary embodiment, the substrate 10 may include a plurality of cells as shown in FIG. 1. Referring to FIG. 2 as an exemplary embodiment of a cell shown in FIG. 1, each of the cells of the substrate 10 may include the emission layer 15 and may be sealed by the sealing member 16.

The sealing member 16 may include a frit, but the invention is not limited thereto.

In an exemplary embodiment of forming the substrate 10 and/or a cell, sealing material of the sealing member 16 is coated on an edge of each cell, and a laser or the like is irradiated to portions thereof coated with the sealing material of the sealing member 16, to cure the sealing material and form the sealing member 16.

In the aforementioned curing operation of the sealing member 16, a cross-section of the sealing member 16 may have a non-uniform width taken in a direction parallel to the top and/or bottom plates 14 and 15. An upper width and a lower width of the formed sealing member 16 may not be uniform.

For example, as shown in FIG. 2, the cured sealing member 16 may be have a trapezoidal shape, e.g., a form in which a lower width is smaller than an upper width thereof, in a cross-section thereof.

Where the cured sealing member 16 has the trapezoidal shape described above, an effective width substantially used for encapsulation may be smaller than an entire width coated with the sealing member 16.

Accordingly, it is possible to detect whether a sealed state is poor by measuring a substantially effective width of the coated sealing member 16.

In the illustrated exemplary embodiment, as shown in FIG. 2, a smaller width, e.g., the lower width of the sealing member 16, is defined as an effective sealing width ES, and a larger width, e.g., the upper width thereof, is defined as the entire sealing width TS.

Further, in exemplary embodiments of the invention, a portion of the substrate 10 coated with the sealing member 16 is defined as the sealed area S.

Hereinafter, a sealing inspection device for inspecting the sealed area S of the substrate 10 will be described with reference to FIG. 3 to FIG. 7.

Figure 3:
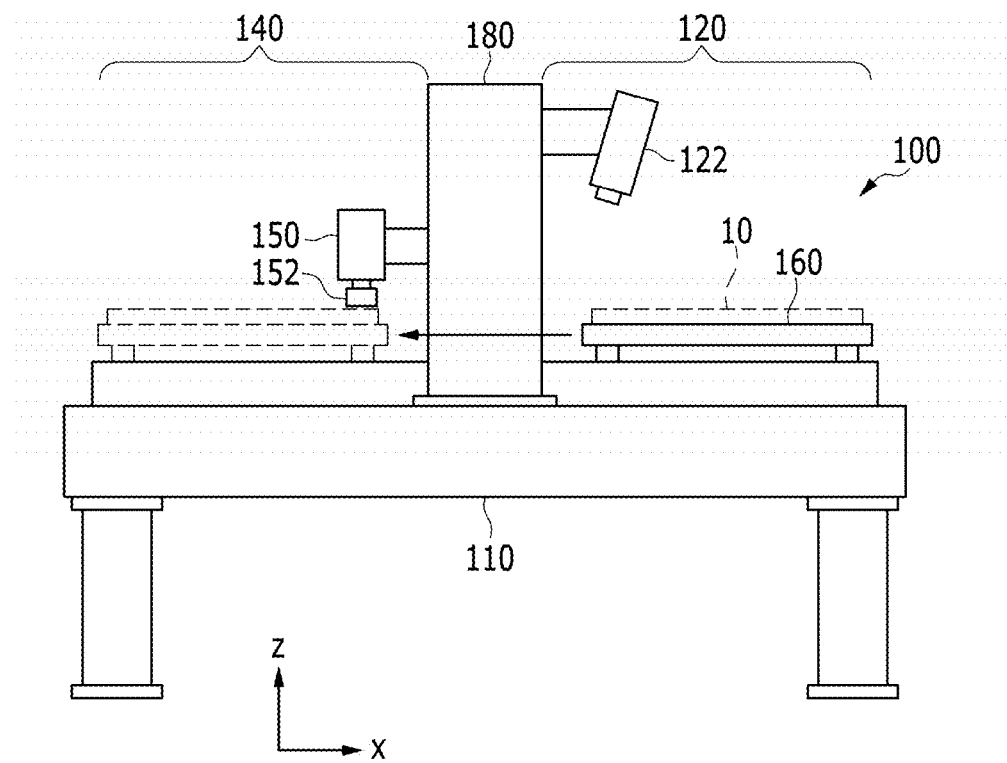
FIG. 3 is a front cross-sectional view of an exemplary embodiment of a sealing inspection device in accordance with the invention.
Figure 4:
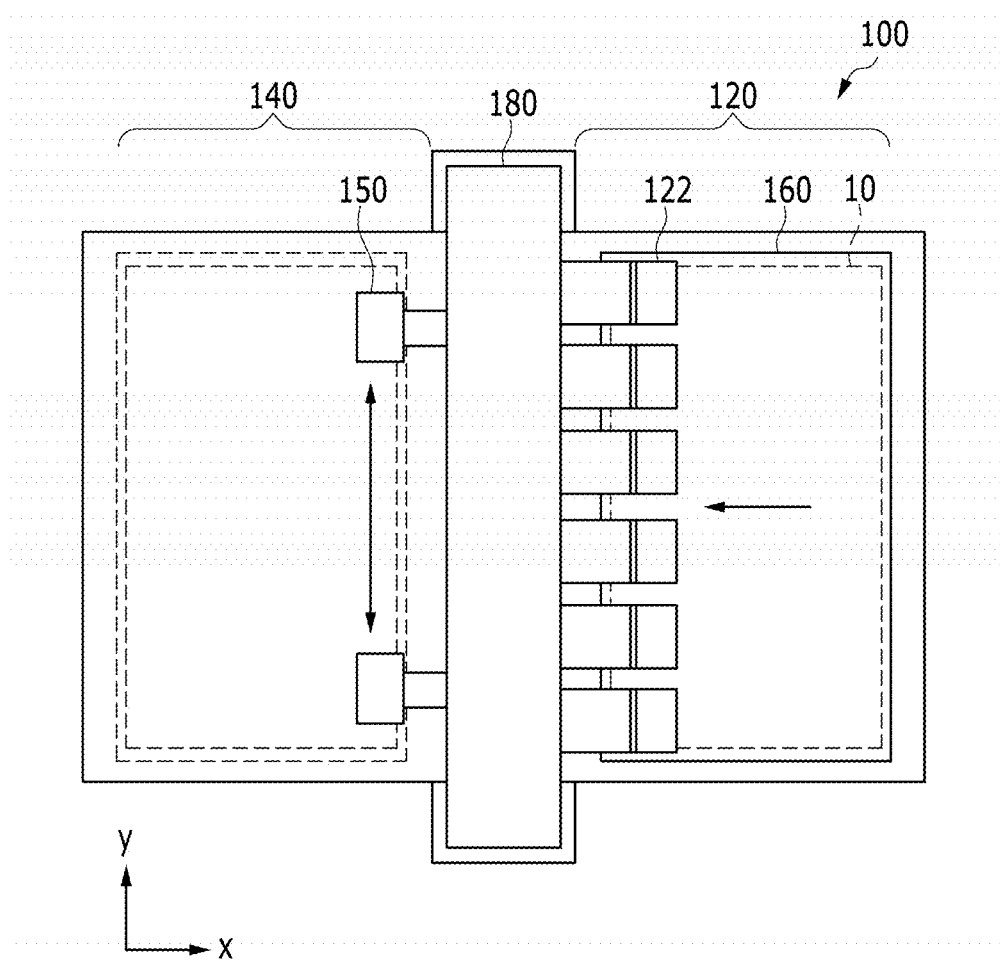
FIG. 4 is a plan view of the sealing inspection device of FIG. 3 in accordance with the invention.
Figure 5:
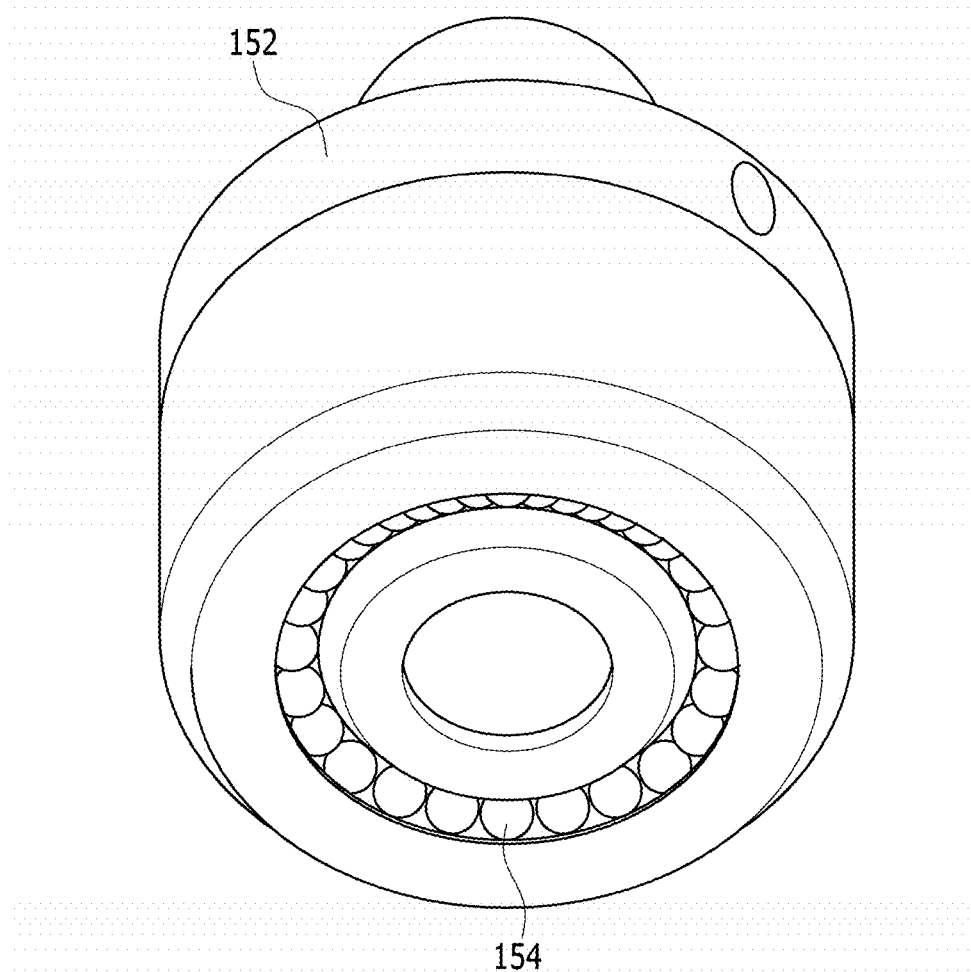
FIG. 5 shows an exemplary embodiment of a microscope lens in a sealing inspection device in accordance with the invention.
Figure 6:
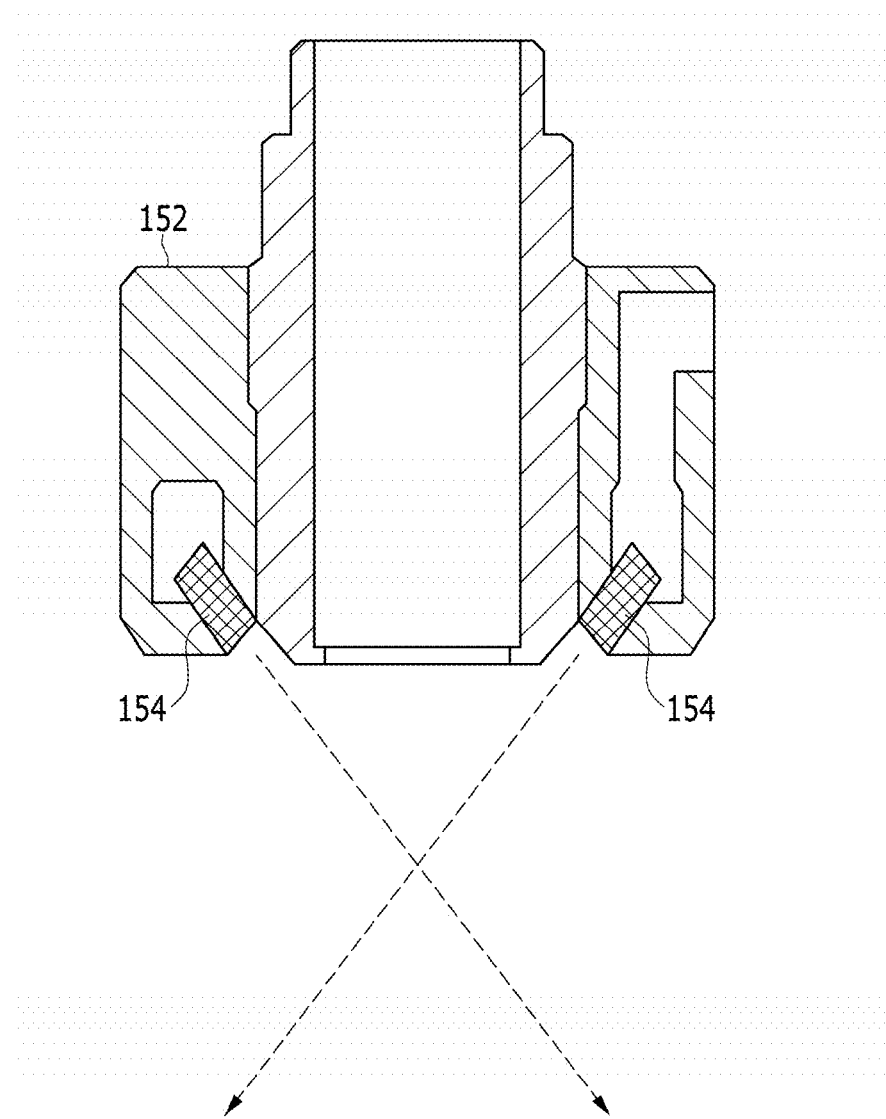
FIG. 6 is a cross-sectional view of the microscope lens of FIG. 5, in accordance with the invention.
Figure 7:
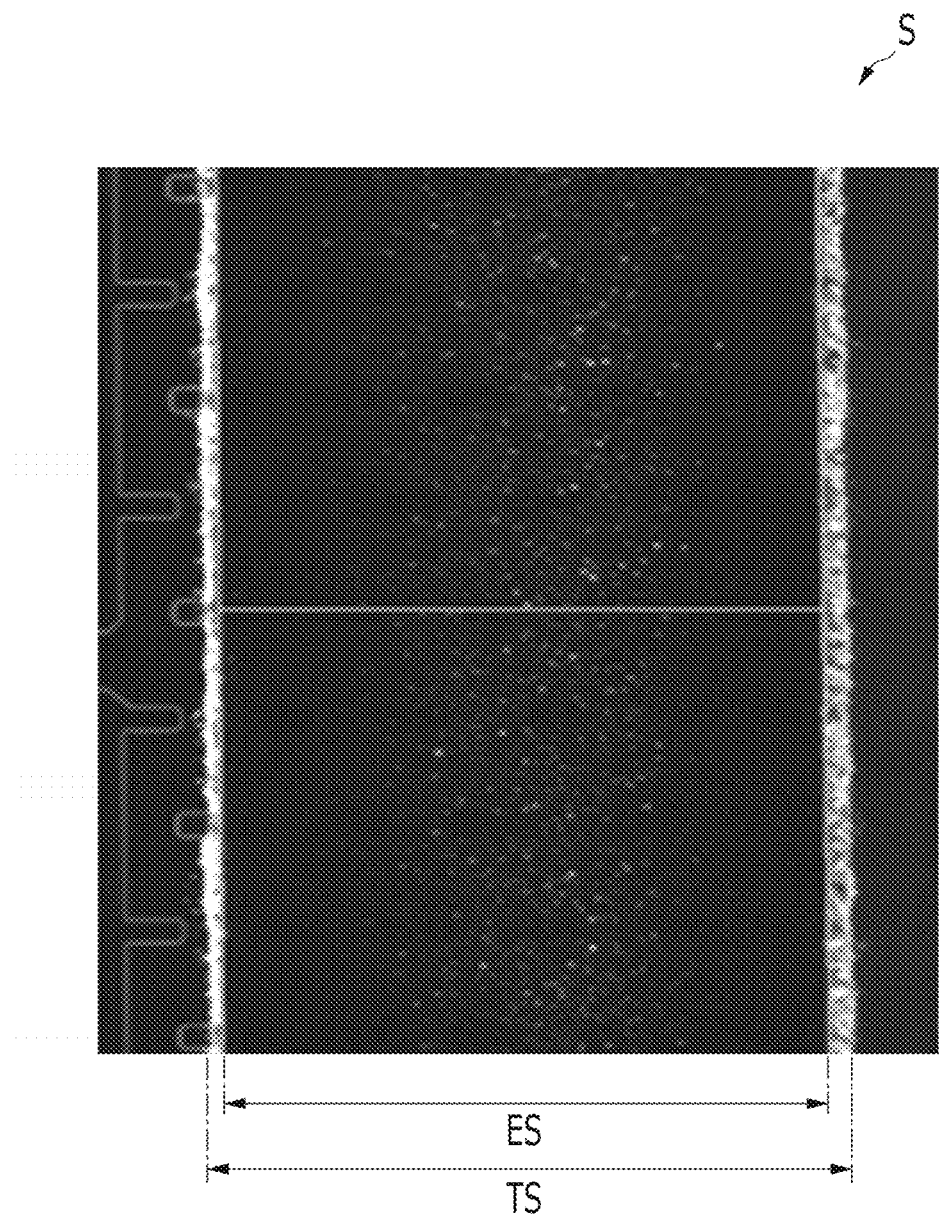
FIG. 7 is a photograph of a sealed state of a sealed area measured by an exemplary embodiment of a sealing inspection device in accordance with the invention.

FIG. 3 is a front cross-sectional view of an exemplary embodiment of a sealing inspection device in accordance with the invention. FIG. 4 is a plan view of the sealing inspection device of FIG. 3 in accordance with the invention. FIG. 5 shows an exemplary embodiment of a microscope lens in a sealing inspection device in accordance with the invention. FIG. 6 is a cross-sectional view of the microscope lens of FIG. 5 in accordance with the invention. FIG. 7 is a photograph of a sealed state of a sealed area measured by an exemplary embodiment of a sealing inspection device in accordance with the invention.

Referring to FIG. 3 and FIG. 4, an exemplary embodiment of a sealing inspection device 100 of the invention serving to inspect a state of the sealed area S in the substrate 10 for a display device may include a frame 110, a column 180, a stage 160, a scan unit 120 and a photographing unit 140.

The frame 110 and the column 180 constitute a body of the sealing inspection device 100. In the illustrated exemplary embodiment, the column 180 may be installed to intersect the frame 110, and a scan camera and a measuring camera to be described later may be installed therein.

The substrate 10 serving as a target object to be inspected, may be mounted on the stage 160. The stage 160 may be substantially flat.

Further, the stage 160 may be equipped with a fixing member for fixing the substrate 10 thereto, e.g., an absorber or a clamper.

In exemplary embodiments, the stage 160 may be movable in at least one axis direction in accordance with the invention.

For example, the stage 160 may be movable in an X-axis direction as shown in FIG. 3 and FIG. 4.

Accordingly, when the substrate 10 serving as a target object to be inspected is mounted on the stage 160, the stage 160 can move the substrate 10 mounted thereon in the axis direction.

Further, in accordance with an exemplary embodiment, the stage 160 can help to perform the sealing inspecting operation efficiently while moving the substrate 10 from the scan unit 120 to the photographing unit 140 to be described later.

The exemplary embodiment of the sealing inspection device 100 may be divided into two parts with respect to the column 180, one of which serves as the scan unit 120 and the other of which serves as the photographing unit 140. The scan unit 120 and the photographing unit 140 will now be described in detail.

The scan unit 120 serves to detect a defective region of the sealed area S of the substrate 10, and may be provided at one side of the sealing inspection device 100.

In accordance with the illustrated exemplary embodiment, the scan unit 120 may include a plurality of scan cameras 122 serving as an imaging member.

As illustrated in FIG. 4, the plurality of scan cameras 122 may be installed and disposed in a line and side-by-side with respect to the column 180. The scan cameras 122 may be attached to the column 180, but are exposed from the column 180 in the scan unit 120 of the sealing inspection device 100.

The installation and disposition of the scan cameras 122 are not limited thereto, and the scan cameras 122 may be installed and disposed at different positions in various ways.

In accordance with an exemplary embodiment, the scan unit 120 is configured to determine coordinate values of the sealed area S of the substrate 10 which passes therethrough by using the scan cameras 122.

Specifically, the substrate 10 may be mounted on the stage 160 to move together with the stage 160 in an axis direction, e.g., in an x-axis direction as shown in FIG. 3 and FIG. 4.

Where the substrate 10 moves together with the stage 160 in the axis direction, in accordance with an exemplary embodiment, the substrate 10 may be moved from the scan unit 120 toward the photographing unit 140 to be described later, so as to pass by the scan cameras 122 installed at one side of the scan unit 120.

Herein, the scan cameras 122 may be disposed to correspond to the sealed area S of the passing substrate 10 so as to photograph the sealed area S.

Accordingly, the scan cameras 122 can photograph the sealed area S of the substrate 10, and thus the scan unit 120 can determine the coordinate values of the sealed area S.

The sealing inspection device 100 may further include a controller (not shown) additionally provided in the scan unit 120 to calculate the coordinate values of the sealed area S photographed by the scan cameras 122.

Further, since the stage 160 on which the substrate 10 is mounted is movable, it is possible to effectively photograph the sealed area S of the substrate 10 even though the location of the scan cameras 122 is fixed.

However, exemplary embodiments of the invention are not limited to fixing the location of the scan cameras 122, and the scan cameras 122 may be configured to move in several directions.

In an exemplary embodiment, the scan unit 120 can detect a defective region of the sealed area S of the substrate 10.

As described above, the scan cameras 122 included in the scan unit 120 are configured to photograph the sealed area S of the substrate 10 passing through the scan unit 120 and detect a defective region of the photographed sealed area S.

The scan unit 120 can determine the coordinate values of the sealed area S of the substrate 10 passing through the scan unit 120 and detect the coordinate values of the defective region of the sealed area S photographed by the scan cameras 122.

Herein, a calculation operation of the coordinate values of the defective region may be performed by a controller (not shown) additionally provided in the scan unit 120

Accordingly, in accordance with the illustrated exemplary embodiment, as the substrate 10 passes through the scan unit 120, the scan unit 120 can detect the coordinate values of the defective region of the sealed area S while determining the coordinate values of the sealed area S of the substrate 10.

As described above, the substrate 10 passing through the scan unit 120 may be moved to the photographing unit 140.

Herein, in the sealing inspection device 100 of the illustrated exemplary embodiment, the photographing unit 140 may be disposed continuously with the scan unit 120, and thus the stage 160 on which the substrate 10 is mounted may be continuously moved from the scan unit 120 to the photographing unit 140. In one exemplary embodiment, for example, the frame 110 and/or the column 180 as the body of the sealing inspection device 100 may provide the structure such that the stage 160 on which the substrate 10 is mounted may continuously move from the scan unit 120 to the photographing unit 140.

The photographing unit 140 serving to generate an image of the sealed area S of the substrate 10 passing through the scan unit 120 may be provided at the other side of the sealing inspection device 100.

The sealing inspection device 100 may be divided into two parts with respect to the column 180, one side of which is allotted to the scan unit 120 and the other side of which is allotted to the photographing unit 140, but is not limited thereto.

In the illustrated exemplary embodiment, the photographing unit 140 may include a measuring camera 150.

The measuring camera 150 serves to photograph a specific region of the sealed area S of the substrate 10 and generate a detailed image of the specific region. The measuring camera 150 may include a microscope lens 152.

In the illustrated exemplary embodiment, the microscope lens 152 may be attachably provided in the measuring camera 150. In one exemplary embodiment, the microscope lens 152 is attachably and detachably disposed with the measuring camera 150.

Specifically, the microscope lens 152 may include a plurality of lenses having different magnifications, and one lens may be replaced with an appropriate lens for photographing as necessary.

The measuring camera 150 may be installed in the column 180 of the sealing inspection device 100 and may be movable in at least one axis direction. The measuring camera 150 may be attached to the column 180, but is exposed from the column 180 in the photographing unit 140 of the sealing inspection device 100.

In the illustrated exemplary embodiment, the measuring camera 150 can be moved in a vertical direction with respect to the moving direction of the stage 160 upon which the substrate 10 is mounted, e.g., in a y-axis direction, as shown in FIG. 4.

However, the moving direction of the measuring camera 150 is not limited to the y-axis direction. The measuring camera 150 may be configured to move in several axis directions as necessary.

In the illustrated exemplary embodiment, the photographing unit 140 can photograph the defective region of the sealed area S of the substrate 10 and generate an image of the defective region, by using the measuring camera 150.

In the illustrated exemplary embodiment, as described above, the scan unit 120 can detect the coordinate values of the defective region of the sealed area S. The coordinate values of the defective region detected by the scan unit 120 may be transferred to the measuring camera 150 of the photographing unit 140, such as by a processor and/or a controller.

Accordingly, the measuring camera 150 can be moved to be located at the defective region of the sealed area S by using the transferred coordinate values of the defective region.

The measuring camera 150 is movable, and the substrate 10 is also movable by the movement of the stage 160.

In accordance with the illustrated exemplary embodiment, for example, the measuring camera 150 can be efficiently located at the defective region since the substrate 10 is movable in the x-axis direction and the measuring camera 150 is movable in the y-axis direction.

In other words, it is possible to locate the measuring camera 150 at a specific region by using only the measuring camera 150 which is movable in a one-axis direction.

Accordingly, a detailed image of the defective region of the sealed area S of the substrate can be photographed and generated by using the measuring camera 150.

In an exemplary embodiment, the photographing unit 140 can measure the effective sealing width ES (see FIG. 2) of the sealed area S by using the measuring camera 150.

Accordingly, it is possible to detect whether or not the sealed state of the sealed area S is defective and detect whether or not the sealing by the sealing member 16 is defective.

The effective sealing widths ES of all sealed areas S may be measured by using the measuring camera 150. However, alternatively, the effective sealing widths ES of specific regions of the sealed areas S of several cells a sample (and not all sealed areas) may be measured to determine whether or not the sealed state is defective.

In addition, it is possible to more precisely inspect the sealed states of the defective regions of the sealed areas S detected by the scan unit 120 by measuring the effective sealing widths ES of the defective regions of the sealed areas detected by the scan unit 120.

In an exemplary embodiment, the measuring camera 150 may use dark-field illumination to measure the effective sealing width of the sealed area S.

The dark-field illumination is an illumination member for effectively observing particles that are smaller than a lens resolution and/or an object included in a transparent sample.

Specifically, in general illumination, light is vertically emitted to a target object and the target object is observed by using thus-reflected light, while in the dark-field illumination, light is obliquely emitted to a target object and the target object is observed by using only light scattered by the target object.

The exemplary embodiment of the sealing inspection device 100 of the invention can photograph not only the entire sealing width TS of the sealed area S, but also the effective sealing width ES as shown in FIG. 2 by using the measuring camera 150 including the dark-field illumination member.

A sealed state of a sealed area S measured by the sealing inspection device, e.g., the measuring camera 150 including the dark-field illumination member is shown in FIG. 7. Referring to FIG. 7, when the sealed area S is photographed by using the measuring camera 150 including the dark-field illumination member, both of the entire sealing width TS and the effective sealing width ES are shown. As a result, the sealed state can be inspected in more detail.

A ratio of the effective sealing width ES to the entire sealing width TS may be calculated. The ratio may be used to obtain an effective sealing effect and may be set up as a reference value in order to determine whether or not the sealed state is poor by using measurements of the effective sealing width ES.

In the illustrated exemplary embodiment, the dark-field illumination member may be attachably installed in the measuring camera 150. In one exemplary embodiment, the dark-field illumination member may be attachable to and detachable from the measuring camera 150.

As described above, the measuring camera 150 may include the microscope lens 152 which includes a plurality of lenses and is configured to be attachable and detachable from the measuring camera 150. The dark-field illumination member may be installed in at least one of the microscope lens 152 and the lenses of the microscope lens 152.

Accordingly, in a case that the sealed area S is photographed by using the measuring camera 150, when the dark-field illumination is required to measure the effective sealing width ES, the microscope lens 152 including the dark-field illumination member may be attached to the measuring camera 150. In one exemplary embodiment, the dark-field illumination member may be attachable to and detachable from the measuring camera 150, via the microscope lens 152.

In accordance with the illustrated exemplary embodiment, the dark-field illumination member may be installed in an annular form at an edge portion of the microscope lens 152.

The dark-field illumination member may be installed obliquely with respect to a facing direction of the microscope lens 152 in order to obliquely emit light to the substrate 10.

In the illustrated exemplary embodiment, as shown in FIG. 5, the dark-field illumination member may include a plurality of point light sources such as a plurality of light emitting diode ("LED") bulbs 154 in an annular arrangement. The LED bulbs 154 emit light obliquely with respect to the facing direction of the microscope lens 152, as illustrated in FIG. 6. Referring to FIG. 1 and FIG. 6, a distal surface of the microscope lens 152 may face and be substantially parallel to the x-y plane, such that the light generated by the LED bulbs 154 is emitted obliquely with respect to the x-y plane.

Accordingly, the light emitted by the LED bulbs 154 travels obliquely with respect to the substrate 10.

As such, the exemplary embodiment of the sealing inspection device 100 of the invention includes the scan unit 120 and the photographing unit 140 to inspect the sealed area S of a substrate 20 more efficiently. The photographing unit 140 can not only photograph and generate the image of the defective region of the sealed area S, but can also more efficiently measure the effective sealing width ES of the sealed area S in order to determine whether or not the sealed state of the substrate 10 is defective.

Hereinafter, an exemplary embodiment of a sealing inspection method using the sealing inspection device 100 in accordance with the invention will be described.

Figure 8:
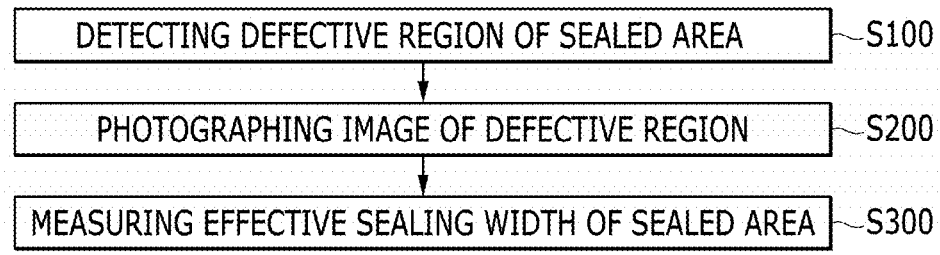
FIG. 8 is a flowchart which shows an exemplary embodiment of a sealing inspection method in accordance with the invention.

FIG. 8 is a flowchart which shows a sealing inspection method in accordance with the invention.

Referring to FIG. 8, the exemplary embodiment of the sealing inspection method includes operations of detecting the defective region in the sealed area S of the substrate (S100); photographing the image of the defective region (S200); and measuring the effective sealing width ES of the sealed area S (S300).

The detecting operation (S100) may be performed by the scan unit 120 of the sealing inspection device 100, and may include generating the coordinate values of the sealed area S, and detecting the coordinate values of the defective region of the sealed area S.

In one exemplary embodiment, a generating operation of the coordinate values of the sealed area S and a detecting operation of the detective region may both be performed by the scan cameras 122 of the scan unit 120. The generating and detecting operations may be performed substantially simultaneously but the invention is not limited thereto.

The photographing operation (S200) and the measuring operation (S300) may both be sequentially performed by the photographing unit 140 and by using the measuring camera 150.

In one exemplary embodiment, the photographing operation (S200) performed by the photographing unit 140 may include: locating the measuring camera 150 at the defective region by using the coordinate values of the defective region detected in the detecting operation; and photographing the defective region to generate an image thereof, by using the measuring camera 150 located at the coordinate values of the defective region.

In the illustrated exemplary embodiment, the measuring camera 150 may be configured to move in at least one axis direction.

The measuring camera 150 is configured to move in a direction perpendicular to the moving direction of the stage 160 upon which the substrate 10 is mounted so as to be efficiently located at the defective region and to generate the image thereof.

The measuring operation (S300) performed by the photographing unit 140 serves to measure the effective sealing width ES of the sealed area S. The measuring operation can measure not only the effective sealing width ES of the defective region imaged in the photographing operation but also that of a specific region of the sealed area S or the entire sealed area S.

In one exemplary embodiment, the effective sealing width ES of the sealed area S can be photographed by using the measuring camera 150 equipped with the dark-field illumination member.

Further, in accordance with an exemplary embodiment, the dark-field illumination member is included in the microscope lens 152 which is attachably and detachably installed with respect to the measuring camera 150 so that the measuring camera 150 used in the photographing operation can also be used in the measuring operation.

Accordingly, both of the photographing operation (S200) and the measuring operation (S300) can be sequentially or simultaneously performed by the photographing unit 140 of the sealing inspection device 100.

As such, in an exemplary embodiment, the coordinate values of the sealed area S of the substrate 10 and the defective region of the sealed area S can be generated and detected by the scan unit 120. Accordingly, the photographing unit 140 can efficiently photograph the defective region of the sealed area S and generate an image of the defective region.

Further, the photographing unit 140 can measure the effective sealing width ES of the sealed area S by using the dark-field illumination. Accordingly, the sealed state of the sealed area S of the substrate 10 is more effectively inspected.

Resultantly, determining the existence of the sealed state of the substrate 10 can be achieved more efficiently by using one or more exemplary embodiment of the sealing inspection method of the invention to thereby improve quality of the substrate 10.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A sealing inspection device for inspecting a state of a sealed area, the device comprising:
   a scan unit through which a display device substrate comprising a top plate coupled to a bottom plate by a sealing member in the sealed area passes; and
   a photographing unit through which the display device substrate which has passed through the scan unit, further passes,
   wherein
   the scan unit generates coordinate values of the sealed area of the display device substrate, detects a defective region in the sealed area of the display device substrate, and comprises a plurality of scan cameras,
   wherein the defective region is defined where upper and lower surfaces of the sealing member are in different planes from each other and have different widths from each other; and
   the photographing unit generates an image of the detected defective region of the sealed area of the display device substrate using the generated coordinate values, the image showing widths of both the upper and lower surfaces of the sealing member in the detected defective region, measures an effective sealing width of the sealed area using the generated image, and comprises a measuring camera,
   wherein the effective sealing width of the sealed area is defined as the smaller of the widths of the upper and lower surfaces of the sealing member which are both shown in the image of the detected defective region.

2. The device of claim 1, wherein the measuring camera comprises a dark-field illumination member.

3. The device of claim 2, wherein the dark-field illumination member is attachable to and detachable from the measuring camera.

4. The device of claim 3, wherein
   the measuring camera comprises a microscope lens which is attachable and detachable therefrom, and
   the dark-field illumination member is in the microscope lens.

5. The device of claim 4, wherein the dark-field illumination member comprises a plurality of point light sources arranged annularly at an edge portion of the microscope lens.

6. The device of claim 5, wherein the plurality of point light sources respectively emit light obliquely with reference to a facing direction of the microscope lens.

7. The device of claim 1, further comprising
   a stage upon which the display device substrate is mounted,
   wherein the stage is configured to move the display device substrate from the scan unit toward the photographing unit.

8. The device of claim 1, wherein the measuring camera is movable in at least one axis direction.

9. The device of claim 1, wherein the display device substrate comprises an organic light emitting element.

10. A sealing inspection method for inspecting a state of a sealed area, the method comprising:
    detecting a defective region of the sealed area of a display device substrate comprising a top plate coupled to a bottom plate by a sealing member in the sealed area, in a scanning unit of a sealing inspection device, the defective region defined where upper and lower surfaces of the sealing member are in different planes from each other and have different widths from each other;
    photographing the detected defective region to generate an image of the detected defective region, in a photographing unit of the sealing inspection device, the image showing widths of both the upper and lower surfaces of the sealing member in the detected defective region; and
    measuring an effective sealing width of the sealed area, the effective sealing width defined as the smaller of the widths of the upper and lower surfaces of the sealing member which are both shown in the image of the detected defective region.

11. The method of claim 10, wherein the detecting comprises:
    generating coordinate values of the sealed area; and
    detecting the coordinate values of the defective region of the sealed area by using a plurality of scan cameras of the scanning unit.

12. The method of claim 11, wherein the photographing comprises:
    positioning a measuring camera of the photographing unit at the defective region of the sealed area by using the detected coordinate values of the defective region; and
    generating the image of the defective region by using the measuring camera positioned at the defective region.

13. The method of claim 10, wherein the measuring the effective sealing width of the sealed area comprises using a measuring camera of the photographing unit, the measuring camera comprising a dark-field illumination member.

14. The method of claim 13, wherein
the measuring camera comprises a microscope lens which is attachable thereto and detachable therefrom, and
the dark-field illumination member is in the microscope lens.

15. The method of claim 14, wherein the dark-field illumination member comprises a plurality of point light sources arranged annularly at an edge portion of the microscope lens.

16. The method of claim 15, wherein the plurality of point light sources respectively emit light obliquely with reference to a facing direction of the microscope lens.

* * * * *